United States Patent
Sebestian

[15] 3,659,862
[45] May 2, 1972

[54] ROTATING SHAFT STUFFING BOX

[72] Inventor: Allison Sebestian, Albany, N.Y.

[73] Assignee: GAF Corporation, New York, N.Y.

[22] Filed: July 29, 1970

[21] Appl. No.: 59,118

[52] U.S. Cl. ......................................................277/106
[51] Int. Cl. .............................................F16j 15/18
[58] Field of Search ...................277/81, 105, 106, 102

[56] References Cited

UNITED STATES PATENTS

| | | | |
|---|---|---|---|
| 2,441,705 | 5/1948 | Jocobsen | 277/106 X |
| 1,971,169 | 8/1934 | Wheeler | 277/81 X |
| 2,299,395 | 10/1942 | Karlberg | 277/81 |

FOREIGN PATENTS OR APPLICATIONS 19,660   3/1912   Great Britain..................277/106

Primary Examiner—Robert I. Smith
Attorney—Samson B. Leavitt, Martin Smolowitz and Walter C. Kehm

[57] ABSTRACT

The rotary shaft of a vacuum and pressure pump is provided with an annular flat shoulder located between sections of different diameters. A stationary cylinder contains the shaft, semi-solid packing material, and the cylindrical part of a spring-loaded gland which is also stationary. The cylindrical part of such gland presses the packing material at its inner annular end toward the flat shoulder on the rotary shaft to form a superior vacuum seal. The shoulder on the shaft is simply formed either by a machining operation, or by welding a collar on the shaft.

2 Claims, 2 Drawing Figures

INVENTOR
Alison Sebastian
ATTORNEY

ROTATING SHAFT STUFFING BOX

This invention relates to stuffing boxes for rotating shafts, and more particularly to vacuum pump rotary shaft seals.

In prior seals for such purpose, the shaft is of uniform diameter, and rotates in a stationary cylinder which contains the packing. The lower part of the packed section is machined to a fairly close fit to the nominal shaft diameter and the packing is inserted in such manner that there is a direct leak path from the inside of the vessel to atmosphere. This leak path is closed or overcome by tightening down on the stuffing box gland and compressing the packing; due to the plasticity of the packing material, it deforms sideways under pressure and presses against the shaft thus creating a seal. As the packing becomes old or as the packing hardens due to exposure to chemical fumes and generated heat, more and more pressure is required to secure a tight seal. As a result of increased pressure, more heat is generated and scoring of the shaft starts and leakage through the stuffing box develops.

The main object of this invention is to provide an improved stuffing box for the rotary shaft of vacuum pumps wherein a superior vacuum seal is obtained.

Another object is to provide such a stuffing box that is simple and economical in construction, and requires little or no maintenance over a substantially long life span.

According to the invention in the improved stuffing box, a lower seal face is provided by welding a collar on the shaft, or by machining the seal face directly on the shaft. In this case, the packing rests on the rotating seal face in the shaft. Only a nominal amount of pressure is required to effect a seal, since the pressure is transmitted directly down through the packing and little plastic deformation of the packing is required. This new seal also tends to be tight regardless of lateral motion of the shaft due to a bent shaft or excessive wear. When the improved stuffing box is subjected to a vacuum, the negative pressure tends to pull the packing down against the lower seal face and enhance the sealing effect.

In general, due to the more effective sealing of the improved stuffing box, there is:

1. Less friction on shaft, reducing heating and wearing of shaft and packing, also a reduction in power requirements.
2. Less packing required and also less expensive packing can be used.
3. A reduction in maintenance to keep stuffing box in good working condition.

Figure 1:
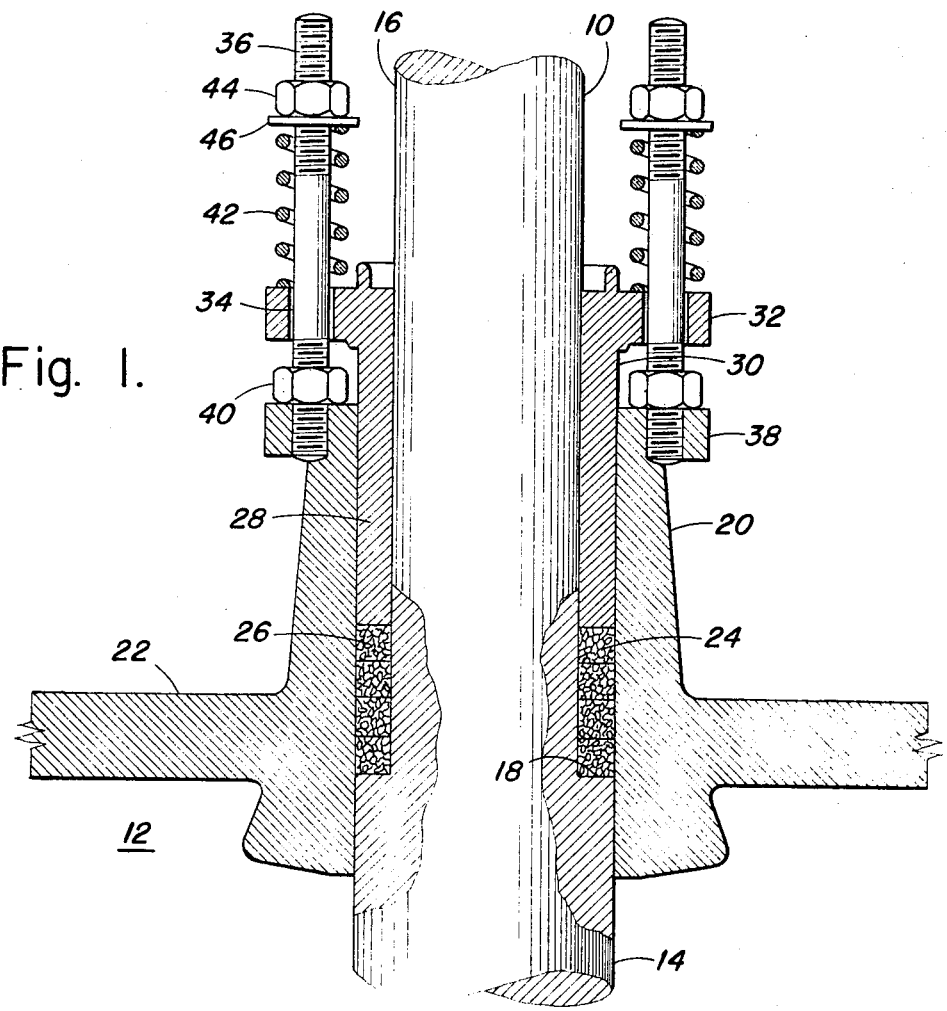
FIG. 1 is a fragmentary view mainly in section of a stuffing box illustrative of the invention.

Referring to FIG. 1, the rotary shaft 10 of a vacuum pump 12 comprises a section 14 of larger diameter than that of section 16, providing an annular flat shoulder 18 that faces upwardly in a plane at right angles to the longitudinal axis of the shaft 10. The larger diameter section 14 fits in bearing relationship with the internal diameter of a stationary cylinder 20 which constitutes part of a horizontal wall 22 between the interior and exterior of the vacuum pump 12.

The cylinder 20 contains plastic packing material 24 which is compressed in the annular space provided therefore between the face of shoulder 18 and the flat face at the inner end 26 at the cylindrical part 28 of gland 30. The gland part 28 fits the internal diameter of the cylinder 20 for longitudinal adjustment, and bears the smaller diameter section 16 of the shaft 10 for rotation therein. The gland 30 is also provided with a flange 32 having vertical holes 34 through which vertical bolt-guides 36 extend. Such bolt-guides are secured to an upper flange 38 of cylinder 20 by "jack" nuts 40, and are provided with compression springs 42. Such springs 42 are adjusted by nuts 44 that are threaded to the bolt-guides 36 above washers 46 that rest on the springs 42. Thus, by adjustment of the nuts 44, the compressive force of the springs 42 can be set to compress the packing material 24, which is plastic, in the stuffing box to provide an ideal vacuum seal between the rotary shaft 10 and stationary cylinder 20.

Figure 2:
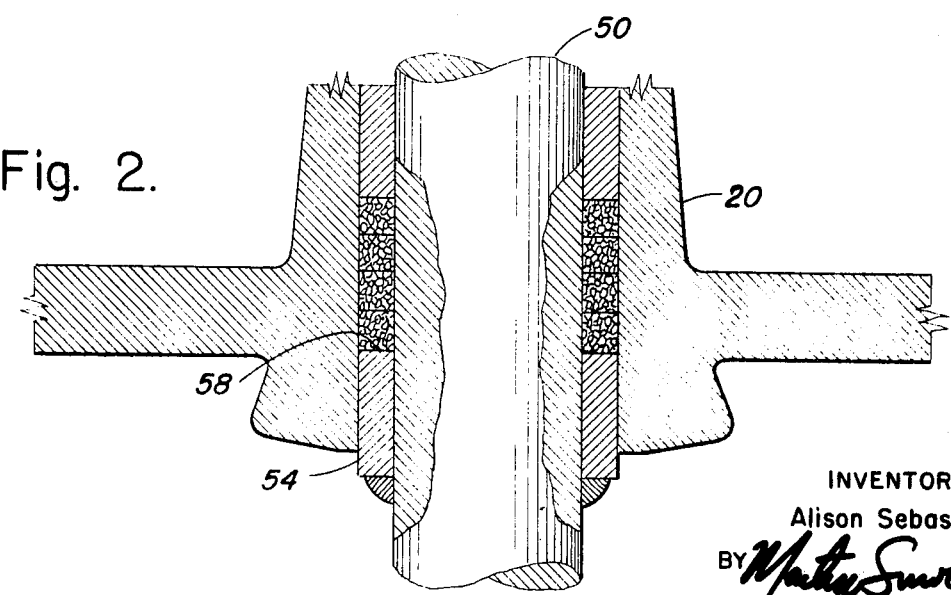
FIG. 2 is a similar view of a modification.

Referring to FIG. 2, a smaller diameter shaft 50 is provided with a collar or sleeve 54 welded thereon to form an annular flat shoulder 58 at the upper end thereof. Such collar 54 thus rotates as part of the shaft 50 in the cylinder 20. Otherwise the construction of the stuffing box of FIG. 2 is similar to that of FIG. 1.

Advantages of the invention include: 1) Simple in parts and construction. 2) Inexpensive to maintain. 3) Large saving in packing cost. 4) Reduced load on shaft. 5) Less energy required to drive the shaft. 6) Small shaft damage. 7) Lateral motion of shaft is permitted without loss of seal. 8) Less rotary shaft function in stuffing box. 9) Reduced wear as well as less erosion of shaft and packing. 10) Less pressure on packing gland for effective seal. 11) 50 percent less packing needed for vacuum seal. 12) Less torque required. 13) Positive seal is provided which is suitable even for vacuum pumps. 14) No special packing is required by the invention. 15) Modification only of the rotary shaft is involved to transform old type stuffing box to that of the invention.

What is claimed is:

1. An improved stuffing box for a pump having a rotating shaft, including means providing an annular flat shoulder between two sections of different constant diameters of said shaft;

a stationary cylinder of constant internal diameter in which said shaft rotates, said internal diameter of said cylinder fitting the section of the shaft having the larger diameter;

a spring-loaded gland externally mounted on one end of said cylinder, and having a cylindrical part the outer diameter of which fits the inner diameter of said cylinder for longitudinal adjustment, and the inner diameter of which fits the smaller diameter of said shaft;

a semi-solid packing material in the space between the inner end of said gland and said annular shoulder of the shaft, said packing material being continuously compressed by the spring-loaded gland to form a seal in the space between the gland and the larger diameter sections of the shaft whereby the opposed faces of the inner end of the gland and of the shoulder are parallel to each other and fall in planes which are at right angles to the longitudinal axis of the shaft.

2. The invention as defined by claim 1, in which the packing material is plastic and provides, when compressed in the stuffing box, an effective vacuum seal between the shaft and cylinder.

* * * * *